(12) United States Patent
Kihara et al.

(10) Patent No.: US 8,786,693 B2
(45) Date of Patent: Jul. 22, 2014

(54) MICROSCOPE SYSTEM AND METHOD OF CONTROLLING A MICROSCOPE SYSTEM

(75) Inventors: Nobuhiro Kihara, Kanagawa (JP); Kiyoshi Osato, Chiba (JP); Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 877 days.

(21) Appl. No.: 12/912,204

(22) Filed: Oct. 26, 2010

(65) Prior Publication Data

US 2011/0102572 A1 May 5, 2011

(30) Foreign Application Priority Data

Nov. 2, 2009 (JP) .............................. P2009-252378

(51) Int. Cl.

| | |
|---|---|
| *H04N 9/47* | (2006.01) |
| *G02B 21/36* | (2006.01) |
| *G02B 21/00* | (2006.01) |
| *G02B 27/00* | (2006.01) |
| *G02B 21/34* | (2006.01) |

(52) U.S. Cl.
CPC ............ *G02B 21/365* (2013.01); *G02B 21/006* (2013.01); *G02B 27/0025* (2013.01); *G02B 21/34* (2013.01)
USPC .............. 348/79; 359/381; 359/383; 359/398

(58) Field of Classification Search
CPC . H01J 2237/1534; H01J 37/153; H01J 37/10; G02B 21/06; G02B 21/244; G02B 21/367; G02B 21/002; G02B 21/365; G02B 21/36; G02B 21/006; G02B 21/02; G02B 21/00; G02B 21/34; G02B 7/38; G02B 15/163; G02B 21/0008; G02B 21/0016; G02B 21/04; G02B 9/04
USPC ................ 348/79; 250/201.3, 234, 311, 310; 378/43, 208; 359/383, 368, 381, 656, 359/391, 398
See application file for complete search history.

(56) References Cited

U.S. PATENT DOCUMENTS

| | | | | |
|---|---|---|---|---|
| 6,563,634 | B2* | 5/2003 | Shimada et al. | 359/368 |
| 7,457,446 | B2* | 11/2008 | Soenksen | 382/128 |
| 7,477,407 | B2* | 1/2009 | Itoh et al. | 356/630 |
| 8,081,553 | B2* | 12/2011 | Hotta et al. | 369/112.02 |
| 2005/0024718 | A1* | 2/2005 | Sase et al. | 359/368 |
| 2005/0156106 | A1* | 7/2005 | Motomura | 250/234 |

FOREIGN PATENT DOCUMENTS

JP 2008-051773 3/2008

* cited by examiner

*Primary Examiner* — Sath V Perungavoor
*Assistant Examiner* — Nathnael Aynalem
(74) *Attorney, Agent, or Firm* — K&L Gates LLP

(57) ABSTRACT

A microscope system includes an accommodation unit, a stage, an optical system, an image pickup unit, a movement mechanism, a control unit, an image processing unit, and a display unit. The accommodation unit is capable of accommodating a plurality of specimens. On the stage, each of the specimens loaded from the accommodation unit is placed. The optical system includes a lens for spherical aberration correction. The image pickup unit is capable of capturing a partial image of each of the specimens placed on the stage, via the optical system. The movement mechanism moves the lens for spherical aberration correction along an optical axis. The control unit controls movement of the lens for spherical aberration correction by the movement mechanism and correct spherical aberration. The image processing unit combines the partial images captured by the image pickup unit and generate a composite image. The display unit displays the generated composite image.

6 Claims, 11 Drawing Sheets

| Thickness of cover slip mm | δ (Object ⇔ Image-forming lens) mm | δ (Image-forming lens ⇔ Objective lens) mm | δ (Objective lens ⇔ Cover slip) mm | rms |
|---|---|---|---|---|
| 0 | 0 | 0 | 0 | 0.568 |
| 1 | 0.006 | −0.326 | −0.681 | 0.106 |
| 2 | 0.013 | −0.652 | −1.361 | 0.711 |
| 3 | 0.019 | −0.977 | −2.042 | 1.344 |
| 4 | 0.025 | −1.302 | −2.722 | 1.978 |
| 5 | 0.032 | −1.629 | −3.403 | 2.613 |
| 6 | 0.038 | −1.954 | −4.084 | 3.248 |
| 7 | 0.044 | −2.28 | −4.764 | 3.884 |
| 8 | 0.051 | −2.606 | −5.445 | 4.52 |
| 9 | 0.057 | −2.931 | −6.126 | 5.156 |
| 10 | 0.064 | −3.257 | −6.807 | 5.792 |

MICROSCOPE SYSTEM AND METHOD OF CONTROLLING A MICROSCOPE SYSTEM

CROSS REFERENCES TO RELATED APPLICATIONS

The present application claims priority to Japanese Priority Patent Application JP 2009-252378 filed in the Japan Patent Office on Nov. 2, 2009, the entire content of which is hereby incorporated by reference.

BACKGROUND

The present invention relates to a microscope system that captures images of a sample such as a biological sample at a high magnification, generates a composite image from the obtained image data, and displays the composite image on a display unit, and to a method of controlling the microscope system.

In recent years, there has been widely known a microscope system in which images of a sample such as a biological sample are captured at a high magnification, and a composite image is generated based on the obtained image data to be displayed on a display unit (see, for example, Japanese Patent Application Laid-open No. 2008-51773 (paragraphs [0022] to [0027], FIG. 1); hereinafter, referred to as Patent Document 1).

Patent Document 1 discloses a fluorescence microscope system including a microscope apparatus (10) and a control apparatus (60). The microscope apparatus (10) acquires a fluorescence observation image of a specimen S in which a biological sample is put on a glass slide. The control apparatus (60) executes control of image acquisition by the microscope apparatus (10), and the like. The microscope apparatus (10) includes a specimen storage unit (11) that is capable of storing a plurality of specimens S, a specimen conveyance unit (14) that conveys the specimens S, and a specimen stage (15) on which the specimens S are placed. Further, the microscope apparatus (10) includes a macro image acquisition unit (20) that acquires a low-magnification image of the specimen S and a micro image acquisition unit (30) that acquires a high-magnification image of the specimen S. The control apparatus (60) executes processing including control of an image acquisition operation in the microscope apparatus (10), setting of image acquisition conditions, processing of an acquired image data of the specimen S, control of displaying an image of the specimen S by a display apparatus (71), and the like.

SUMMARY

Incidentally, a sample such as a biological sample is generally held by transparent holding members such as a microscope slide and a cover slip and an image thereof is acquired by a microscope system. Therefore, since the cover slip intervenes between the sample and an optical system (lens) used for capturing an image of the sample, spherical aberration is caused and there arises a problem that a highly precise image of the sample is difficult to be acquired. In addition, the sample such as a biological sample may be semi-transparent in some cases, which may become a cause of spherical aberration.

In this regard, for example, it is conceived that an objective lens with a function of a correction collar, which has been known from the past, is adopted in the optically system and the spherical aberration is corrected. However, in the objective lens with a function of a correction collar, generally, a user has to manually rotate the correction collar to correct the spherical aberration, which is troublesome.

In the microscope system, a plurality of (for example, 100) high-magnification images are acquired for one sample and combined to be displayed on the display unit. Since a thickness of the cover slip (or sample itself) to be a cause of the spherical aberration is not precisely even, in order to correct the spherical aberration, the user has to adjust a rotation angle of the correction collar, for example, 100 times, thus correcting the spherical aberration. Therefore, particularly in the microscope system, it is troublesome to manually correct the spherical aberration.

In view of the circumstances as described above, it is desirable to provide a microscope system capable of automatically correcting spherical aberration, and a method of controlling the microscope system.

According to an embodiment, there is provided a microscope system including an accommodation unit, a stage, an optical system, an image pickup unit, a movement mechanism, a control unit, an image processing unit, and a display unit.

The accommodation unit is capable of accommodating a plurality of specimens.

On the stage, each of the specimens loaded from the accommodation unit is placed.

The optical system includes a lens for spherical aberration correction.

The image pickup unit is capable of capturing a partial image of each of the specimens placed on the stage, via the optical system.

The movement mechanism moves the lens for spherical aberration correction along an optical axis.

The control unit controls movement of the lens for spherical aberration correction by the movement mechanism and corrects spherical aberration.

The image processing unit combines the partial images captured by the image pickup unit and generates a composite image.

The display unit displays the generated composite image.

In the embodiment, since the movement of the lens for spherical aberration correction by the movement mechanism is controlled by the control unit, the spherical aberration can be automatically corrected. As a result, the inconvenience caused when the spherical aberration is manually corrected each time the partial image is captured can be eliminated.

In the microscope system, the control unit may calculate a first distance between an upper surface of each of the specimens and a focus position of the optical system, and control the movement mechanism to move the lens for spherical aberration correction in accordance with the first distance.

The spherical aberration has a relative relationship with the first distance extending from the upper surface of the specimen to the focus position. Therefore, a position of the lens for spherical aberration correction, which is appropriate for correction of the spherical aberration, has a relative relationship with the first distance.

In the embodiment, the lens for spherical aberration correction is moved in accordance with the first distance by the control of the control unit, with the result that the lens for spherical aberration correction can be moved to an appropriate position and the spherical aberration can be corrected with precision.

In the microscope system, the control unit may move the lens for spherical aberration correction such that a distance between the focus position of the optical system and an image-forming position is kept constant.

As a result, high-speed and simple focusing is realized.

The microscope system may further include a pre-scan unit to pre-scan each of the specimens before the image pickup unit captures the partial image of each of the specimens. In this case, the control unit may calculate the first distance based on information obtained by the pre-scan unit.

In the embodiment, it is possible to calculate the first distance by effectively using the information obtained by the pre-scan unit. As a result, it is unnecessary to additionally provide a new member or the like to the microscope system in order to calculate the first distance, which leads to cost reduction.

The microscope system may further include a thickness measurement unit to measure a thickness of each of the specimens. In this case, the control unit may calculate the first distance based on information of the thickness of each of the specimens.

Also when the first distance is calculated in this manner, the spherical aberration can be corrected appropriately.

The microscope system may further include a microscope tube, a movement unit, and a distance measurement unit.

The microscope tube includes the optical system.

The movement unit moves at least one of the microscope tube and the stage along the optical axis.

The distance measurement unit measures a second distance between a predetermined position on the microscope tube side and the upper surface of each of the specimens.

In this case, the control unit may execute focusing by controlling the movement unit and calculate the first distance based on information of the second distance obtained from the distance measurement unit at a time when focus is obtained.

Also when the first distance is calculated in this manner, the spherical aberration can be corrected appropriately.

In a case where the microscope system may further include a microscope tube including the optical system and a movement unit to move at least one of the microscope tube and the stage along the optical axis, the control unit may execute focusing by controlling the movement unit.

In this case, the control unit may execute focusing of a through-the-lens system.

According to another embodiment, there is provided a method of controlling a microscope system, the method including loading a specimen from an accommodation unit capable of accommodating a plurality of specimens and placing the specimen on a stage.

Spherical aberration is corrected by control of a movement mechanism that moves a lens for spherical aberration correction along an optical axis of an optical system including the lens for spherical aberration correction.

Information of a partial image of the specimen placed on the stage is acquired from an image pickup unit that is capable of capturing the partial image via the optical system.

A composite image is generated based on the information of the partial image.

The generated composite image is displayed on a display unit.

As described above, according to the embodiments of the present application, it is possible to provide a microscope system capable of automatically correcting spherical aberration, and a method of controlling the microscope system.

Additional features and advantages are described herein, and will be apparent from the following Detailed Description and the figures.

DETAILED DESCRIPTION

The present application is described below in detail with reference to the drawings according to an embodiment. The detailed description is provided as follows:

(First embodiment)

Overall structure of microscope system and structures of individual units

Figure 1:
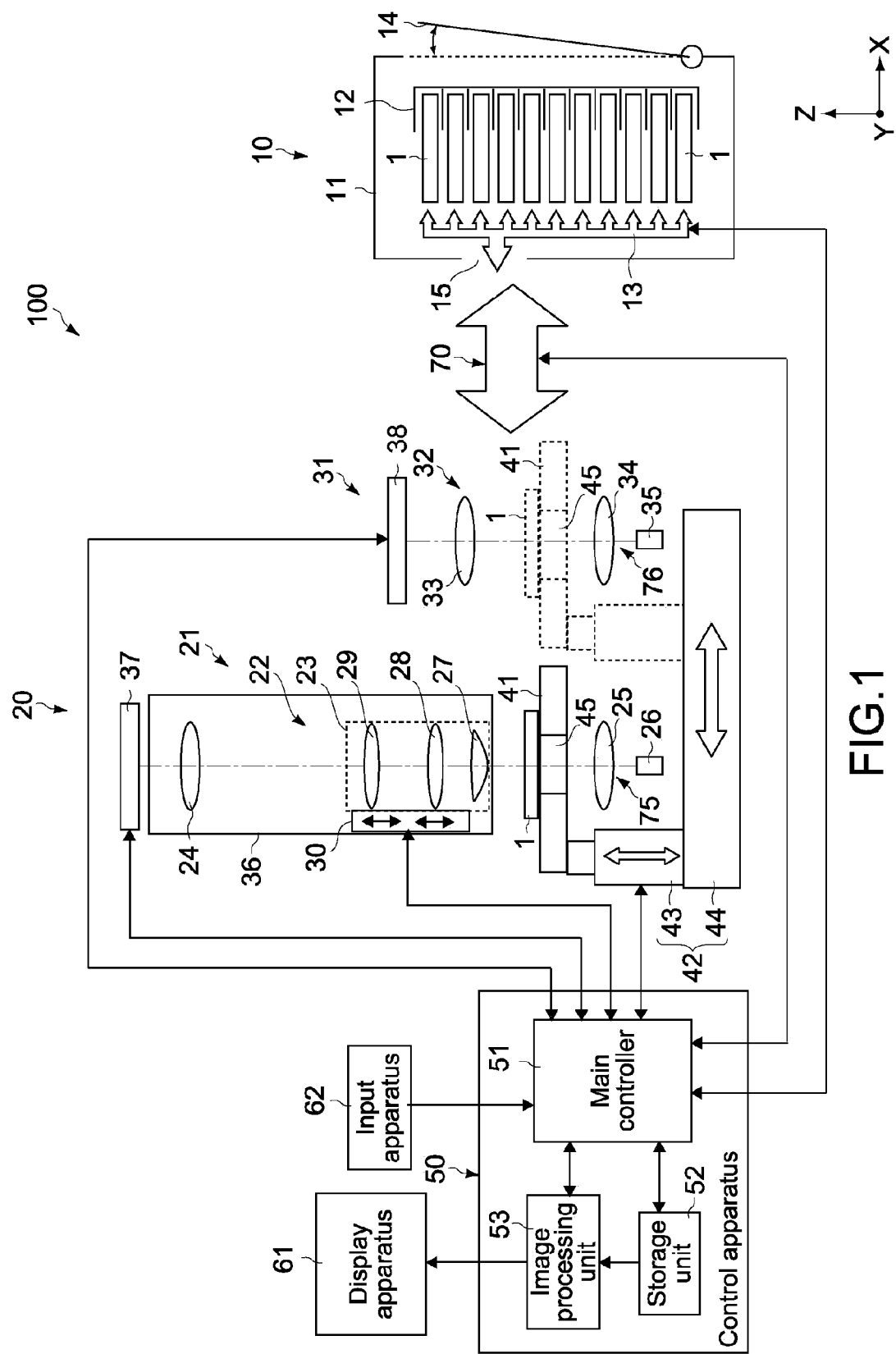
FIG. 1 is a diagram showing an overall structure of a microscope system according to an embodiment.
Figure 2A:
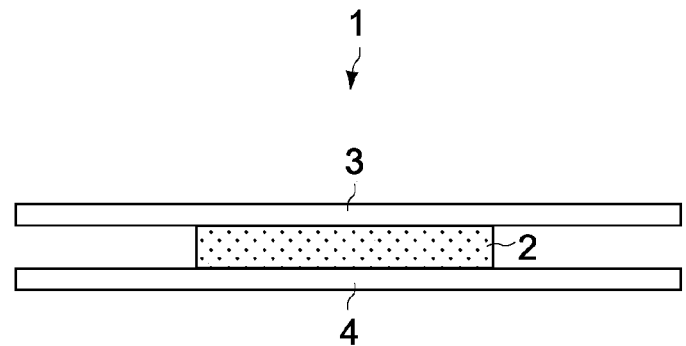
FIGS. 2 are diagrams showing an example of a specimen observed by the microscope system.
Figure 2B:
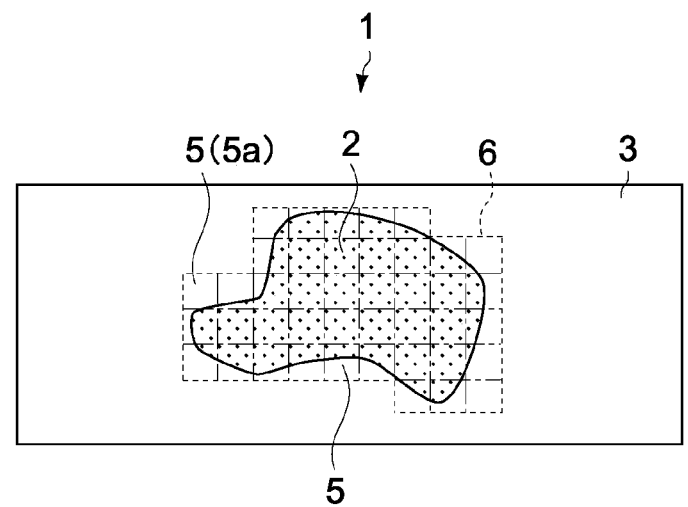

FIG. 1 is a diagram showing an overall structure of a microscope system according to a first embodiment. FIGS. 2 are diagrams showing an example of a specimen observed by the microscope system. FIG. 2A is a side view of the specimen and FIG. 2B is a plan view of the specimen. It should be noted that in the drawings explained herein, the sizes of apparatuses included in the microscope system, members included in the apparatuses, and the like may be changed from the actual dimensions thereof in some cases for easier understanding of the drawings.

As shown in FIG. 1, a microscope system 100 includes an accommodation apparatus 10 that can accommodate a plurality of specimens 1, a microscope apparatus 20 that acquires image data of the specimens 1, and a conveyance apparatus 70 that conveys the specimens 1 between the accommodation apparatus 10 and the microscope apparatus 20. Further, the microscope system 100 includes a display apparatus 61 that displays an image of the specimen 1 (sample 2), an input apparatus 62, and a control apparatus 50 that collectively controls the apparatuses described above.

As shown in FIGS. 2, the specimen 1 includes a microscope slide 4, a cover slip 3, and a sample 2 that is interposed between and held by the microscope slide 4 and the cover slip 3.

As a material of the microscope slide 4 and the cover slip 3, optical glass such as BK7 (registered trademark) is used, but the material is not limited thereto.

As the sample 2, for example, pathological samples and biological tissue samples of animals except for humans, plants, and the like are used. The type of the sample 2 is not particularly limited, and a sample selected as appropriate from the fields of medicine, drugs, foods, agriculture, and the like may be used.

The accommodation apparatus 10 includes an accommodation apparatus main body 11, a rack mechanism 12, and a loading mechanism 13. The rack mechanism 12 accommodates the plurality of specimens 1 arranged in a rack manner therein. The loading mechanism 13 loads any specimen 1 selected from the plurality of specimens 1 accommodated in the rack mechanism 12.

At a side portion of the accommodation apparatus main body 11, an open/close unit 14 that is used when a user takes in and out the specimen 1 is provided. Further, at another side portion of the accommodation apparatus main body 11, an opening 15 for the loading mechanism 13 loading the specimen 1 is provided.

The rack mechanism 12 is detachable from the accommodation apparatus main body 11. The rack mechanism 12 is taken in and out with respect to the accommodation apparatus main body 11 via the open/close unit 14 with the plurality of specimens 1 being arranged in a rack manner.

The loading mechanism 13 is constituted of, for example, a conveyor belt and a drive source such as a motor that drives the conveyor belt, though not shown. The drive source such as a motor is electrically connected to a main controller 51 of a control apparatus 50. The loading mechanism 13 can selectively load any specimen 1 of the plurality of specimens 1 accommodated in the rack mechanism 12 from the accommodation apparatus main body 11 in accordance with the control of the main controller 51. Further, the loading mechanism 13 can accommodate a specimen that has already been subjected to imaging and is passed from the conveyance apparatus 70, at the original position in the rack mechanism 12.

The conveyance apparatus 70 is constituted of, for example, a conveyor belt and a drive source such as a motor that drives the conveyor belt, though not shown. The drive source such as a motor is electrically connected to the main controller 51. The conveyance apparatus 70 conveys the specimen 1 loaded from the accommodation apparatus main body 11 onto a stage 41 of the microscope apparatus 20 in accordance with the control of the main controller 51. Further, the conveyance apparatus 70 conveys, from the stage 41, the specimen 1 that has already been subjected to imaging by the microscope apparatus 20 to pass the specimen 1 to the loading mechanism 13.

The microscope apparatus 20 includes the stage 41 onto which the specimen 1 is placed, and a movement mechanism 42 for moving the stage 41 in a vertical direction (z-axis direction) and a horizontal direction (x-axis and y-axis directions). Further, the microscope apparatus 20 includes a pre-scan unit 31 that pre-scans the specimen 1, and a high-magnification image acquisition unit 21 that acquires a high-magnification image (partial image) of the specimen 1.

In the vicinity of the center of the stage 41, an opening 45 for an optical path is provided. Further, the stage 41 is provided with a holding unit (now shown) that holds the specimen 1 so as not to be displaced when the specimen 1 is placed onto the stage 41. The specimen 1 is conveyed by the conveyance apparatus 70 to a position at which the opening 45 for an optical path in the stage 41 is provided, and is held by the holding unit. The stage 41 is movable between the pre-scan unit 31 and the high-magnification image acquisition unit 21.

The movement mechanism 42 includes an ascent/descent unit 43 that moves the stage 41 in a vertical direction (z-axis direction), and a horizontal movement unit 44 that moves the stage 41 in a horizontal direction (x-axis and y-axis directions). The movement mechanism 42 includes a mechanism such as a ball screw, a rack and pinion, or a belt and pulley, and a drive source such as a stepper motor that drives the mechanism. The drive source such as a stepper motor is electrically connected to the main controller 51. The movement mechanism 42 feeds back positional information of the stage 41 to the main controller 51, as positional information of the specimen 1.

The high-magnification image acquisition unit 21 includes a microscope tube 36, a high-magnification optical system 22 disposed in the microscope tube 36, an illumination optical system 75, and a first image pickup unit 37.

The high-magnification optical system 22 includes an objective lens 23 and an image-forming lens 24.

Figure 3:
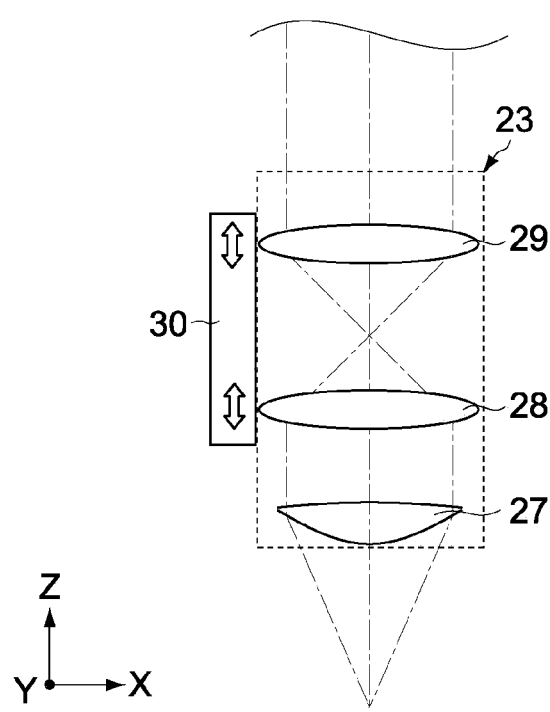
FIG. 3 is an enlarged view of an objective lens.

FIG. 3 is an enlarged view of the objective lens 23.

As shown in FIG. 3, the objective lens 23 includes a condenser lens 27 and spherical aberration correction lenses 28 and 29. The spherical aberration correction lenses 28 and 29 correct spherical aberration caused by the cover slip 3 (or cover slip 3 and sample 2). In other words, the objective lens 23 is an objective lens with a function of a correction collar.

A spherical surface of the condenser lens 27 is aspheric on both sides, and the spherical aberration of the condenser lens 27 is corrected.

The spherical aberration correction lenses 28 and 29 are held by a lens movement mechanism 30 so as to be movable along an optical axis. The lens movement mechanism 30 includes a drive source such as a stepper motor (not shown). The drive source is electrically connected to the main controller 51. Relative positions of the spherical aberration correction lenses 28 and 29 are displaced in accordance with the control of the main controller 51 and the spherical aberration is corrected accordingly.

FIGS. 1 and 3 each show a case where two spherical aberration correction lenses are used. However, the number of spherical aberration correction lenses may be one, or three or more. The number of spherical aberration correction lenses may not be limited particularly.

The illumination optical system 75 includes an illumination lens 25 and an illumination light source 26.

As the illumination light source 26, a xenon lamp or a halogen lamp is used, for example. The illumination optical system 75 is not limited to a diascopic illumination, and may be constituted of an episcopic illumination. The same holds true for an illumination optical system 76 in a pre-scan unit to be described later.

The first image pickup unit 37 is disposed at an image-forming position of the high-magnification optical system 22. The first image pickup unit 37 includes an image pickup device such as a CCD (Charge Coupled Device) sensor or a CMOS (Complementary Metal Oxide Semiconductor) sensor.

The pre-scan unit 31 includes a pre-scan optical system 32, the illumination optical system 76, and a second image pickup unit 38. The pre-scan unit 31 is used for acquiring an imaging range 6 of the specimen 1 (see dotted lines of FIG. 2B), focus information, and the like before a high-magnification image of the specimen 1 is acquired.

The pre-scan optical system 32 includes an image pickup lens 33. Further, the pre-scan optical system 32 includes one lens group or a plurality of lens groups (not shown) used when structure information of the specimen 1 is acquired.

The illumination optical system 76 includes an illumination lens 34 and an illumination light source 35.

The second image pickup unit 38 is disposed at an image-forming position of the pre-scan optical system 32. The second image pickup unit 38 includes an image pickup device such as a CCD (Charge Coupled Device) sensor or a CMOS (Complementary Metal Oxide Semiconductor) sensor.

The control apparatus 50 is, for example, a PC (Personal Computer), and includes the main controller 51 including a CPU (Central Processing Unit) and the like, a storage unit 52, and an image processing unit 53.

The main controller 51 is electrically connected to the respective units included in the microscope system 100, and collectively controls the microscope system 100. For example, the main controller 51 executes processing of controlling the loading of the specimen 1, the movement of the spherical aberration correction lenses 28 and 29, the movement of the stage 41, and the like. Further, the main controller 51 acquires image information from the first image pickup unit 37 and the second image pickup unit 38, the positional information of the stage 41 from the movement mechanism 42 (positional information of specimen 1), and the like.

For the storage unit 52, a disc-like storage medium such as a magnetic disc or an optical disk is used. Alternatively, the storage unit may be a storage medium such as a solid-state (semiconductor, dielectric, or magnetoresistive) memory.

The storage unit 52 stores various programs necessary for processing by the microscope system 100, look-up tables, and the like. Further, the storage unit 52 stores image information, information of an imaging range, focus information, positional information of the stage (positional information of specimen), and the like, which are output from the main controller 51.

The image processing unit 53 extracts the image information and the positional information that are stored in the storage unit 52, and executes image processing based on the extracted image information and positional information. Further, the image processing unit 53 outputs an image generated by the image processing to the display apparatus 61 so that the image is displayed on the display apparatus 61, in accordance with the control of the main controller 51.

The display apparatus 61 is constituted of, for example, a liquid crystal display, an EL (Electro-Luminescence) display, or the like. The input apparatus 62 includes a keyboard, a mouse, and the like.

Description of Operation

Next, the processing by the microscope system 100 according to this embodiment will be described.

First, as a preliminary step of the processing by the microscope system 100, a plurality of specimens 1 are prepared by a user. In this case, the user slices a sample 2 and interposes the sliced sample 2 between the microscope slide 4 and the cover slip 3, thus preparing a plurality of specimens 1.

The user opens the open/close unit 14 of the accommodation apparatus 10 and takes out the rack mechanism 12 from the accommodation apparatus 10. Then, the user sets the plurality of specimens 1 in the rack mechanism 12 taken out from the accommodation apparatus 10. The user takes in the rack mechanism 12 into the accommodation apparatus 10 via the open/close unit 14, the rack mechanism 12 being set with the plurality of specimens 1, and mounts the rack mechanism 12 in the accommodation apparatus 10. In this case, the rack mechanism 12 is mounted at a predetermined position within the accommodation apparatus 10 and fixed.

Next, the user operates the input apparatus 62 to instruct the control apparatus 50 to start processing, and then the processing by the microscope system 100 is started.

Figure 4:
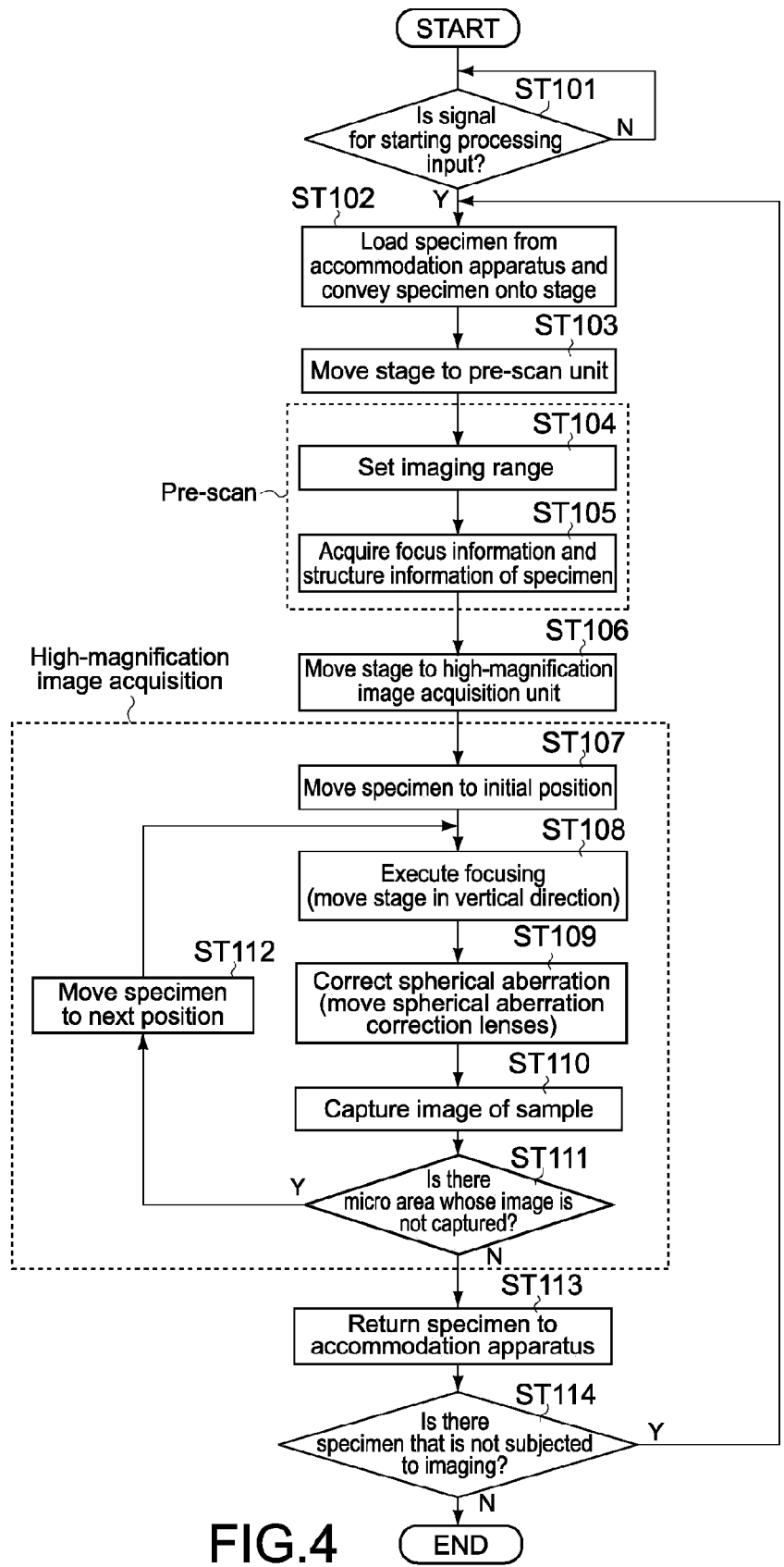
FIG. 4 is a flowchart showing processing by the microscope system.

FIG. 4 is a flowchart showing the processing by the microscope system 100.

The main controller 51 judges whether a signal for starting the processing is input from the input apparatus 62 (Step 101).

In a case where a signal for starting the processing is not input (NO in Step 101), the main controller 51 returns to Step 101 and judges again whether a signal for starting the processing is input. In other words, the main controller 51 is in a standby state while waiting for an input of a signal for staring the processing.

When a signal for starting the processing is input from the input apparatus 62 (YES in Step 101), the main controller 51 proceeds to the next Step 102. In Step 102, the main controller 51 drives the loading mechanism 13 and selectively loads, from the accommodation apparatus 10, any specimen 1 of the plurality of specimens 1 accommodated in the rack mechanism 12. The specimen 1 loaded from the accommodation apparatus 10 is passed to the conveyance apparatus 70. The main controller 51 drives the conveyance apparatus 70 to convey the specimen 1 loaded from the accommodation apparatus 10 onto the stage 41. The specimen 1 is disposed at a position of the stage 41 that corresponds to the opening 45 for an optical path, the opening 45 being provided in the vicinity of the center of the stage 41, and held by the holding unit (not shown) so as not to be displaced.

When the specimen 1 is conveyed onto the stage 41, the main controller 51 drives the movement mechanism 42 to move the stage 41 to a position of the pre-scan unit 31 (Step 103).

Next, the main controller 51 executes pre-scan (Steps 104 and 105).

In the pre-scan, the imaging range 6 of the specimen 1 is set (see dotted lines of FIG. 2B) (Step 104), and focus information and structure information of the specimen 1 are acquired (Step 105).

In the setting of the imaging range 6 of the specimen 1 in Step 104, first, the main controller 51 captures an image of the entire specimen 1 by the second image pickup unit 38, thus acquiring the entire image of the specimen 1. Next, the main controller 51 detects an edge of the sample 2 based on luminance information of the captured entire image of the specimen 1. Then, the main controller 51 sets an area surrounded by the edge as an imaging range 6, and stores the imaging range 6 in the storage unit 52.

It should be noted that the imaging range 6 is set with micro areas 5 each serving as a unit area of the specimen (see dotted lines of FIG. 2B). The micro area 5 is a unit area corresponding to a high-magnification image captured in the high-magnification image acquisition unit 21. The micro area 5 has a size of 1 mm×1 mm, for example, but it is not limited thereto.

In the acquisition of the focus information in Step 105, for example, autofocus of a TTL (Through the Lens) system is used for acquiring focus information. Examples of the autofocus of a TTL system include autofocus of a contrast (image sharpness) system and autofocus of a phase difference system, but the autofocus of a TTL system is not limited thereto.

In a case where the autofocus of a contrast system is executed, the main controller 51 acquires image information from the second image pickup unit 38 and detects image sharpness from this image data. To evaluate the image sharpness, used is a signal that indicates an intensity of a high-frequency component obtained when a signal of the image information passes through a BPF (band pass filter), or sharpness of a blurring width of a signal of the image information extracted by differentiation.

The main controller 51 moves the stage 41 in the z-axis direction such that the image sharpness is increased. Then, the main controller 51 reverses the direction of the movement of the stage 41 at a point at which the increase of the image sharpness is switched to a decrease, and stops the stage 41 at a point at which the image sharpness becomes maximum.

The main controller 51 stores a focused position of the stage 41 in the z-axis direction, as focus information.

In a case where the autofocus of a phase difference system is used, for example, a pair of CCD line sensors, a pupil division unit, a half mirror, and the like (that are not shown) are added to the pre-scan optical system 32. The half mirror is provided, for example, at a predetermined position on the optical axis and guides a part of a pencil of light to the CCD line sensor side.

Each of the CCD line sensors as a pair receives a pencil of light that is obtained by dividing a pencil of light into two in the pupil division unit, and outputs a signal corresponding to an amount of the received light to the main controller 51. The main controller 51 detects a displacement amount of the signals output based on the amounts of the received light, that is, a displacement amount of relative positions in the division directions of the pencils of light. Then, the main controller 51 calculates a defocus amount.

The main controller 51 calculates a focus position based on the defocus amount. Then, the main controller 51 stores the calculated focus position in the storage unit 52, as focus information.

The focus information is typically acquired for all micro areas 5 included in the imaging range 6 of the specimen 1. Since the main controller 51 already recognizes the imaging range 6, the focus information for micro areas 5 included in the imaging range 6 only needs to be acquired.

Alternatively, the focus information may be acquired for micro areas 5 selected as representative areas, out of the micro areas 5 included in the imaging range 6. The number of micro areas 5 selected as representative areas is four, for example, but the number is not limited thereto. The number of micro areas 5 selected as representative areas may be variable in accordance with the size of the imaging range 6.

In a case where the focus information of all the micro areas 5 is acquired, an advantage is obtained in terms of image quality. In a case where the focus information of representative areas is acquired, an advantage is obtained in terms of time efficiency.

The case where the focus information is acquired for all the micro areas 5 and the case where the focus information is acquired for representative areas may be switched to each other.

In Step 105, the acquisition of structure information of the specimen 1 is executed in addition to the acquisition of the focus information. The structure information of the specimen 1 includes a thickness of the cover slip 3, a thickness of the sample 2, a thickness of the microscope slide 4, and the like. The structure information of the specimen 1 is acquired by one lens group or a plurality of lens groups (not shown) included in the pre-scan optical system 32.

Typically, the structure information of the specimen 1 is acquired for all the micro areas 5 included in the imaging range 6 of the specimen 1, though not limited thereto. The structure information of the specimen 1 may be acquired for micro areas 5 that are selected as representative areas, out of the micro areas 5 included in the imaging range 6. The case where the structure information of the specimen 1 is acquired for all the micro areas 5 and the case where the structure information of the specimen 1 is acquired for representative micro areas 5 may be switched to each other.

When the processing in the pre-scan unit 31 is terminated, the main controller 51 drives the movement mechanism 42 to move the stage 41 to the high-magnification image acquisition unit 21 (Step 106). Then, the main controller 51 proceeds to Step 107 and acquires a high-magnification image of the specimen 1 in Step 107 and thereafter.

In this case, the main controller 51 first moves the stage 41 on a horizontal plane by the drive of the horizontal movement unit 44, and moves the specimen 1 placed on the stage 41 to an initial position (Step 107).

Here, the initial position is a position corresponding to a micro area 5 whose high-magnification image is captured first, out of the micro areas 5 included in the imaging range 6 of the specimen 1. When the specimen 1 is moved to the initial position, the micro area 5 whose high-magnification image is captured first is arranged on an optical axis of the high-magnification optical system 22.

The micro area 5 whose image is captured first is, for example, a micro area 5a located at an upper left portion out of the micro areas 5 included in the imaging range 6, but the micro area 5a is not limited thereto. The micro area 5 whose image is captured first may be a micro area 5 located at a lower left, upper right, or lower right portion. The micro area 5 whose image is captured first may not be particularly limited.

Next, the main controller 51 moves the stage 41 in the vertical direction by the drive of the ascent/descent unit 43 of the movement mechanism 42, and moves the specimen 1 along the optical axis of the high-magnification optical system 22. Thus, the main controller 51 executes focusing of a micro area 5 whose image is to be captured (Step 108). In this case, the main controller 51 moves the stage 41 in the vertical direction based on the focus information acquired in Step 105 described above, and executes the focusing of the micro area 5 whose image is to be captured.

Next, the main controller 51 drives the lens movement mechanism 30 to move the spherical aberration correction lenses 28 and 29 to appropriate positions and corrects spherical aberration (Step 109).

In this case, the main controller 51 drives the lens movement mechanism 30 to move the spherical aberration correction lenses 28 and 29 along the optical axis based on the information acquired in the pre-scan unit 31, and corrects the spherical aberration.

The spherical aberration correction will be described more in details.

Figure 5:
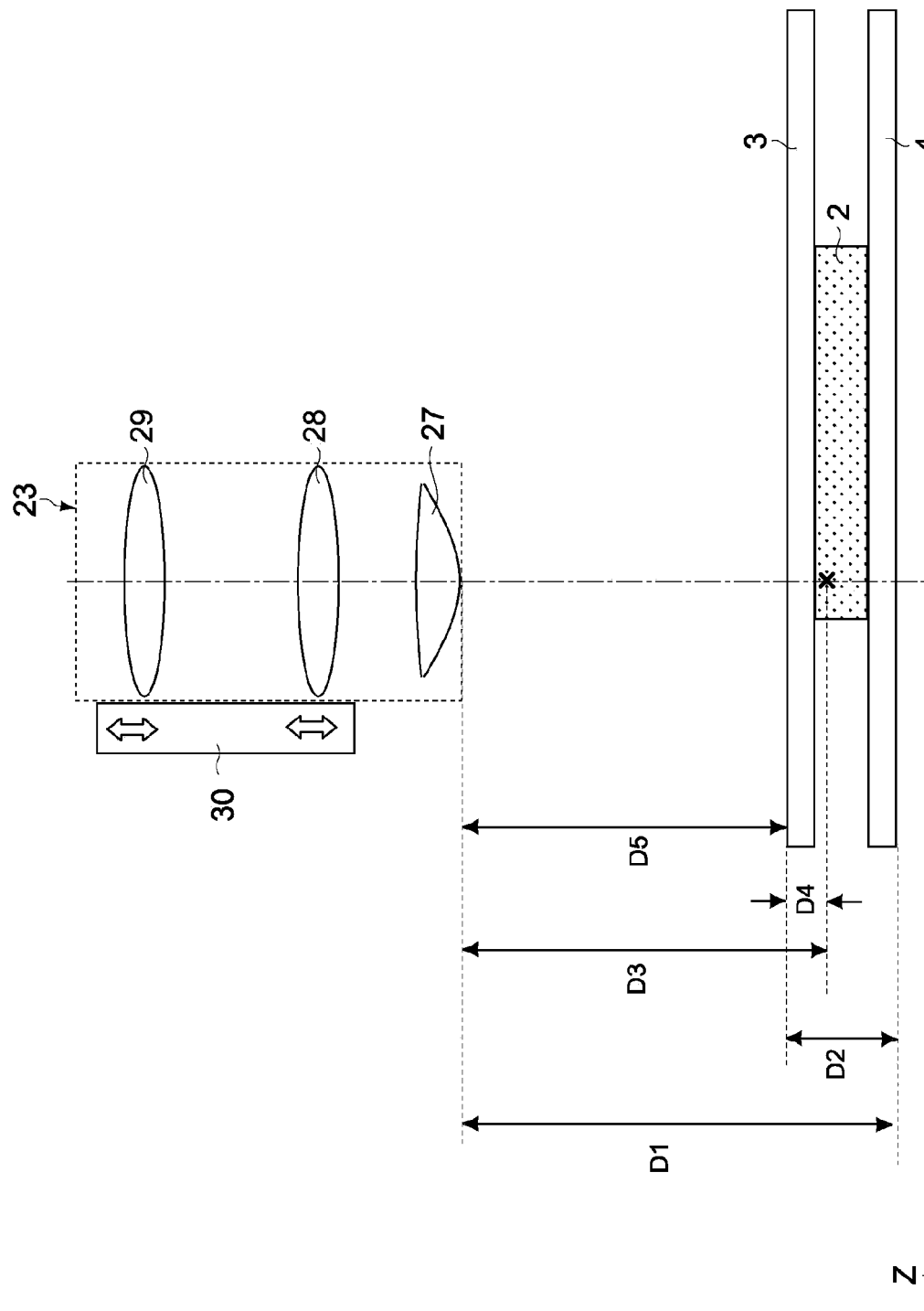
FIG. 5 is a diagram for explaining a basic idea of spherical aberration correction.

FIG. 5 is a diagram for explaining a basic idea of the spherical aberration correction.

FIG. 5 shows a case where a focus position (see mark of x) is located at a position slightly displaced from the bottom surface of the cover slip 3.

The spherical aberration has a relative relationship with a distance D4 (first distance) extending from an upper surface of the cover slip 3 to the focus position. Therefore, the positions of the spherical aberration correction lenses 28 and 29 at a time of spherical aberration correction has a relative relationship with the distance D4 extending from the upper surface of the cover slip 3 to the focus position. As a result, if the main controller 51 can recognize the distance D4 extending from the upper surface of the cover slip 3 to the focus position, the main controller 51 can correct spherical aberration by moving the spherical aberration correction lenses 28 and 29 to appropriate positions.

Since the main controller 51 acquires the focus information at the time of pre-scan (Step 105) as described above, a distance D1 from a leading end portion of the condenser lens 27 on a front surface side thereof to the bottom surface of the microscope slide 4 is known. In addition, since the main controller 51 acquires the structure information of the specimen 1 at the time of pre-scan (Step 105), a distance D2 from the upper surface of the cover slip 3 to the bottom surface of the microscope slide 4 (thickness of specimen 1) is also known.

Further, a distance D3 from the leading end portion of the condenser lens 27 on the front surface side thereof to the focus position is also grasped based on a focal length of the condenser lens 27.

Accordingly, the distance D4 from the upper surface of the cover slip 3 to the focus position can be calculated according to Expression (1) below.

$$D4=D2+D3-D1 \quad (1)$$

The main controller 51 obtains movement amounts of the spherical aberration correction lenses 28 and 29 based on the distance D4 thus calculated, and moves the spherical aberration correction lenses 28 and 29 to appropriate positions.

Typically, the main controller 51 refers to a look-up table in which a relationship between the distance D4 and the positions of the spherical aberration correction lenses 28 and 29 is indicated, obtains movement amounts of the spherical aberration correction lenses 28 and 29, and moves the spherical aberration correction lenses 28 and 29 to appropriate positions. Alternatively, the main controller 51 may obtain movement amounts of the spherical aberration correction lenses 28 and 29 based on the distance D4 according to a program stored in the storage unit 52.

In the description on FIG. 5, there has been described the case where the leading end portion of the condenser lens 27 on the front surface side is set as a reference in the distance D1 and the distance D3. However, the positions to be set as references in the distance D1 and the distance D3 may not be the leading end portion of the condenser lens 27 on the front surface side. The position to be set as a reference in each of the distance D1 and the distance D3 may be any position as long as it is a fixed position on the microscope tube 36 side.

Referencing back to FIG. 4, when the spherical aberration is corrected, the main controller 51 captures an image of a micro area 5 of the specimen 1 (sample 2) by the first image pickup unit 37, and acquires a high-magnification image (Step 110). The high-magnification image is stored in the storage unit 52 together with the positional information of the stage 41 (positional information of specimen 1).

In Step 110, the main controller 51 may change the position of the stage 41 in the z-axis direction by the drive of the movement mechanism 42 and acquire a plurality of high-magnification images. Specifically, the main controller 51 may acquire a plurality of high-magnification images while scanning the specimen 1 in the z-axis direction. In this case, the main controller 51 acquires a plurality of high-magnification images while scanning the specimen 1 in the z-axis direction based on the structure information of the specimen 1 (thickness of each of cover slip 3, sample 2, and microscope slide 4), the structure information being acquired in Step 105 described above. The movement amount of the stage 41 in the z-axis direction for each acquisition of a high-magnification image is 10 μm, for example, but the movement amount is not limited thereto.

When the images of all the micro areas 5 of the specimen 1 are captured, the main controller 51 judges whether there is a micro area 5 whose image is not captured in the imaging range 6 (Step 111).

In a case where there is a micro area 5 whose image is not captured (YES in Step 111), the main controller 51 moves the stage 41 in the horizontal direction by the drive of the horizontal movement unit 44, and moves the specimen 1 to the next position (Step 112). When the specimen 1 is moved to the next position, a micro area 5 whose image is to be captured next is arranged on the optical axis of the high-magnification optical system 22. It should be noted that the order in which images of the micro areas 5 included in the imaging range 6 of the specimen 1 are captured is not particularly limited.

When the specimen 1 is moved to the next position, the main controller 51 executes the processing shown in Steps 108 to 110 again, and acquires a high-magnification image of the specimen 1 (sample 2).

In a case where in Step 111, there is no micro area 5 whose image is not captured (NO in Step 111), that is, the images of all the micro areas 5 included in the imaging range 6 are captured, the main controller 51 proceeds to the next Step 113.

In Step 113, the main controller 51 executes processing of returning the specimen 1 that has been subjected to imaging to the accommodation apparatus 10. In this case, first, the main controller 51 drives the horizontal movement unit 44 of the movement mechanism 42 to move the stage 41 to the conveyance apparatus 70 side, and passes the specimen 1 that has been subjected to imaging to the conveyance apparatus 70. The main controller 51 controls the conveyance apparatus 70 and the loading mechanism 13 to return the specimen 1 that has been subjected to imaging to the original position of the accommodation apparatus 10.

When the specimen 1 that has been subjected to imaging is returned back to the original position, the main controller 51 judges whether there is a specimen 1 that is not subjected to imaging in the accommodation apparatus 10 (Step 114). In a case where there is a specimen 1 that is not subjected to imaging (YES in Step 114), the main controller 51 returns to Step 102 and executes the processing shown in Steps 102 to 113. Then, the main controller 51 acquires a high-magnification image of the specimen 1.

In a case where in Step 114, there is no specimen that is not subjected to imaging (NO in Step 114), that is, images of all the specimens 1 accommodated in the accommodation apparatus 10 are captured, the processing of acquiring images by the main controller 51 is terminated.

The image processing unit 53 generates a composite image based on the captured high-magnification images (partial images) and positional information indicating positions where the high-magnification images are acquired. When a composite image is generated, the image processing unit 53 outputs the generated composite image to the display apparatus 61 for display in accordance with the control of the main controller 51. In this manner, an image of the specimen 1 (sample 2) is displayed on the display apparatus 61.

Action etc.

As described above, in this embodiment, the spherical aberration correction lenses 28 and 29 are moved to correct spherical aberration by the control of the main controller 51, with the result that the spherical aberration can be automatically corrected. As a result, the processing efficiency is improved as compared to a case where spherical aberration is manually corrected, and in addition, the inconvenience caused when spherical aberration is manually corrected can be eliminated.

Further, in this embodiment, the main controller 51 calculates the distance D4 extending from the upper surface of the cover slip 3 to the focus position and corrects spherical aberration based on the distance D4, with the result that the spherical aberration can be corrected with precision.

In addition, in this embodiment, the information acquired in the pre-scan unit 31 (focus information for focusing in high-magnification image acquisition unit 21, structure information of specimen 1 for scan in z-axis direction) is used effectively, with the result that the distance D4 can be calculated. As a result, it is unnecessary to additionally provide a new member or the like for calculating the distance D4 to the microscope system, which leads to cost reduction.

Modified example of first embodiment

In the description of the first embodiment, the distance D4 extending from the upper surface of the cover slip 3 to the focus position is calculated by Expression (1) above. However, the distance D4 can also be calculated by other methods other than Expression (1) above.

With reference to FIG. 5, for example, the distance D4 extending from the upper surface of the cover slip 3 to the focus position may be calculated by Expression (2) below.

$$D4 = D3 - D5 \quad (2)$$

Specifically, the distance D4 extending from the upper surface of the cover slip 3 to the focus position may be calculated from a difference between the distance D3 and the distance D5, the distance D3 extending from the leading end portion of the condenser lens 27 on the front surface side to the focus position, the distance D5 (second distance) extending from the leading end portion of the condenser lens 27 on the front surface side to the upper surface of the cover slip 3.

In a case where the distance D4 is calculated by Expression (2) above, the microscope system 100 is additionally provided with a distance sensor (distance measurement unit) (not shown) that detects the distance D5 extending from the leading end portion of the condenser lens 27 on the front surface side to the upper surface of the cover slip 3.

The main controller 51 may acquire information of the distance D5 from the distance sensor and calculate the distance D4 based on that information of the distance, for example, when the focusing in Step 108 is executed and then obtained.

Also when the distance D4 is calculated in such a method, the spherical aberration can be corrected with precision.

It should be noted that FIG. 5 shows the case where the leading end portion of the condenser lens 27 on the front surface side is set as a reference in the distance D5. However, the position to be set as a reference in the distance D5 may not be the leading end portion of the condenser lens 27 on the front surface side. The position to be set as a reference in the distance D5 may be any position as long as it is a fixed position on the microscope tube 36 side.

(Second embodiment)

Next, a second embodiment will be described.

In the second embodiment, the structure of the microscope system 100 and the structures of the respective units of the microscope system 100 are generally the same as those in the first embodiment. Therefore, an operation of the microscope system 100 will be mainly described. It should be noted that in descriptions in the second embodiment and thereafter, the microscope system 100 and the respective units of the microscope system 100, which have been described in the first embodiment, are denoted by the same reference numerals.

Figure 6:
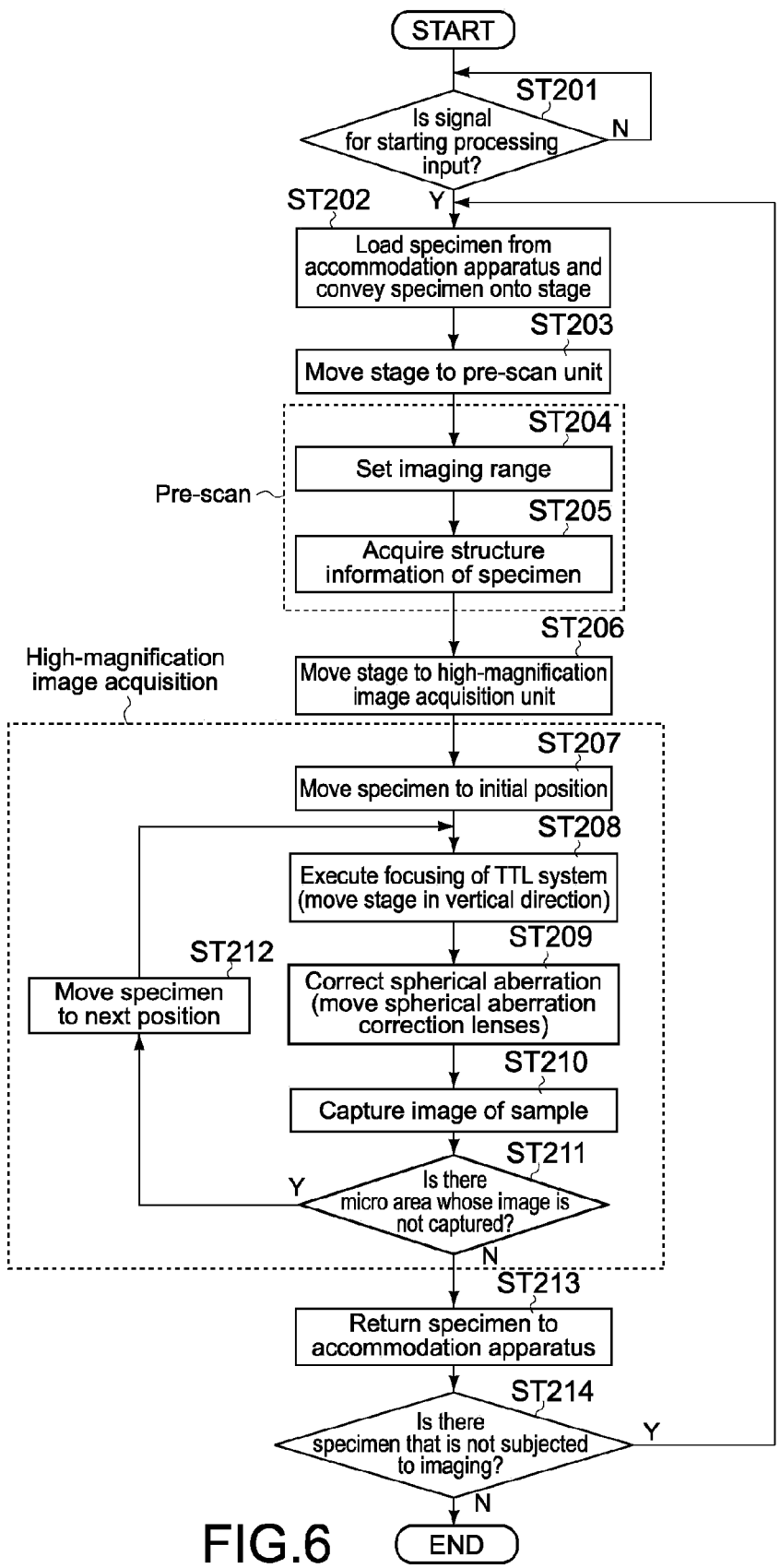
FIG. 6 is a flowchart showing an operation of a microscope system according to another embodiment.

FIG. 6 is a flowchart showing an operation of a microscope system according to the second embodiment.

In the description on the processing of the microscope system 100 according to the first embodiment described above, the focus information is acquired when the pre-scan unit 31 performs pre-scan (see Step 105 of FIG. 4). On the other hand, the processing of the microscope system 100 according to the second embodiment is different from the processing of the microscope system 100 according to the first embodiment described above in that a focus position is detected when a high-magnification image is acquired in the high-magnification image acquisition unit 21 (see Step 208 of FIG. 6).

The main controller 51 judges whether a signal for starting the processing is input from the input apparatus 62 (Step 201). In a case where a signal for starting the processing is input, a specimen 1 is loaded from the accommodation apparatus 10 and conveyed onto the stage 41 (Step 202).

Next, the main controller 51 moves the stage 41 to the pre-scan unit 31 (Step 203) and executes pre-scan of the specimen 1. The main controller 51 acquires the entire image of the specimen 1 and through a detection of an edge of the entire image, sets an imaging range 6 of the specimen 1 (Step 204).

Next, the main controller 51 acquires structure information of the specimen 1 (thickness of each of cover slip 3, sample 2, and microscope slide 4) (Step 205). It should be noted that focus information is not acquired when the pre-scan is performed.

When the pre-scan is terminated, the main controller 51 moves the stage 41 to the high-magnification image acquisition unit 21 (Step 206) and acquires a high-magnification image of the specimen 1.

The main controller 51 moves the stage 41 in the horizontal direction so that the specimen 1 is moved to an initial position (Step 207).

Next, autofocus of a TTL system is used to execute focusing. Examples of the autofocus of a TTL system include autofocus of a contrast (image sharpness) system and autofocus of a phase difference system.

In a case where the autofocus of a contrast system is executed, the main controller 51 only needs to detect image sharpness from image data acquired by the first image pickup unit 37 and stop the movement of the stage 41 in the z-axis direction at a point at which the image sharpness becomes maximum.

In a case where the autofocus of a phase difference system is used, for example, a pair of CCD line sensors, a pupil division unit, a half mirror, and the like (that are not shown) are added to the high-magnification optical system 22. The half mirror is provided, for example, on the optical axis between the objective lens 23 and the image-forming lens 24, and guides a part of a pencil of light to the CCD line sensor side. Each of the CCD line sensors as a pair receives a pencil of light that is obtained by dividing a pencil of light into two in the pupil division unit, and outputs a signal corresponding to an amount of the received light to the main controller 51. The main controller 51 detects a displacement amount of the signals output based on the amounts of the received light, and then calculates a defocus amount. The main controller 51 moves the stage 41 in the z-axis direction based on the calculated defocus amount.

When the focusing of the TTL system is ended, the main controller 51 calculates movement amounts of the spherical aberration correction lenses 28 and 29 based on the distance D4 extending from the upper surface of the cover slip 3 to the focus position. Then, the main controller 51 moves the spherical aberration correction lenses 28 and 29 to appropriate positions in the z-axis direction in accordance with the calculated movement amounts, and corrects spherical aberration.

Any of Expressions (1) and (2) above may be used for calculating the distance D4 extending from the upper surface of the cover slip 3 to the focus position. It should be noted that in a case where Expression (2) above is used, the microscope system 100 is additionally provided with a distance sensor that detects the distance D5 extending from the leading end portion of the condenser lens 27 on the front surface side to the upper surface of the cover slip 3.

When the spherical aberration is corrected, the main controller 51 captures an image of a micro area 5 of the specimen 1 by the first image pickup unit 37, and acquires a high-magnification image of the specimen 1 (sample 2) (Step 210). In Step 210, a plurality of high-magnification images may be acquired while the scan is performed in the z-axis direction. In this case, the main controller 51 acquires a plurality of high-magnification images while scanning the specimen 1 in the z-axis direction based on the structure information of the specimen 1 that is acquired when the pre-scan is performed.

Next, the main controller 51 judges whether there is a micro area 5 whose image is not captured (Step 211). In a case where there is a micro area 5 whose image is not captured, the main controller 51 moves the stage 41 in the horizontal direction to move the specimen 1 to the next position (Step 212). Then, the main controller 51 executes the processing shown in Steps 208 to 210 again, and acquires a high-magnification image of the specimen 1 (sample 2). It should be noted that since focus positions are detected for all the micro areas 5 included in the imaging range 6 by the TTL system in the second embodiment, an advantage is obtained in terms of image quality as compared to a case where the focus position is detected for representative areas.

In a case where images of all the micro areas 5 included in the imaging range 6 are captured (NO in Step 211), the main controller 51 returns the specimen 1 that has been subjected to imaging to the original position in the accommodation apparatus 10 (Step 213).

Next, the main controller 51 judges whether there is a specimen 1 that is not subjected to imaging in the accommodation apparatus 10 (Step 214). In a case where there is a specimen 1 that is not subjected to imaging, the main controller 51 returns to Step 202 and executes the processing shown in Steps 202 to 213. On the other hand, when images of all the specimens 1 accommodated in the accommodation apparatus 10 are captured, the processing of acquiring images by the main controller 51 is terminated.

An action and effect that is similar to that in the first embodiment described above is produced also by the above processing. Specifically, the spherical aberration correction lenses 28 and 29 are moved to correct spherical aberration by the control of the main controller 51, with the result that the spherical aberration can be automatically corrected. As a result, the processing efficiency is improved as compared to a case where spherical aberration is manually corrected, and in addition, the inconvenience caused when spherical aberration is manually corrected can be eliminated.

Modified example of second embodiment

In the second embodiment, it is possible to omit the pre-scan unit 31. Specifically, in the second embodiment, a focus position is detected in the high-magnification image acquisition unit 21, so the pre-scan unit 31 may not be necessarily provided.

Here, in the case where the pre-scan unit 31 is omitted, the structure information of a specimen 1 is not acquired in Step 205. In this case, the information of the distance D2 (distance from upper surface of cover slip 3 to bottom surface of microscope slide 4) indicated in the right-hand member of Expression (1) above is not acquired.

Therefore, in the case where the pre-scan unit 31 is omitted, the distance D4 (from upper surface of cover slip 3 to focus position) used for the correction of spherical aberration is calculated using Expression (2) above.

Alternatively, in the case where the pre-scan unit 31 is omitted, it may be possible to additionally provide a thickness measurement unit (not shown) to the microscope system, the thickness measurement unit measuring the distance D2 extending from the upper surface of the cover slip 3 to the bottom surface of the microscope slide 4 (total thickness of specimen 1), and calculate the distance D4 using Expression (1) above. Though the thickness measurement unit may be provided to any position of the microscope system 100, for example, it is provided in the accommodation apparatus 10 or to the conveyance apparatus 70. The main controller 51 only needs to calculate the distance D4 by Expression (1) based on the distance D2 measured by the thickness measurement unit and correct spherical aberration.

(Third embodiment)

Next, a third embodiment will be described.

The third embodiment is different from the embodiments described above in the structure of a high-magnification optical system. In the third embodiment, there is provided a structure in which, even when lenses included in a high-magnification optical system are moved and spherical aberration is corrected, a distance between a focus position of the high-magnification optical system and an image-forming position (hereinafter, referred to as object-to-image distance) can be kept constant. Therefore, that point will be mainly described.

Figure 7:
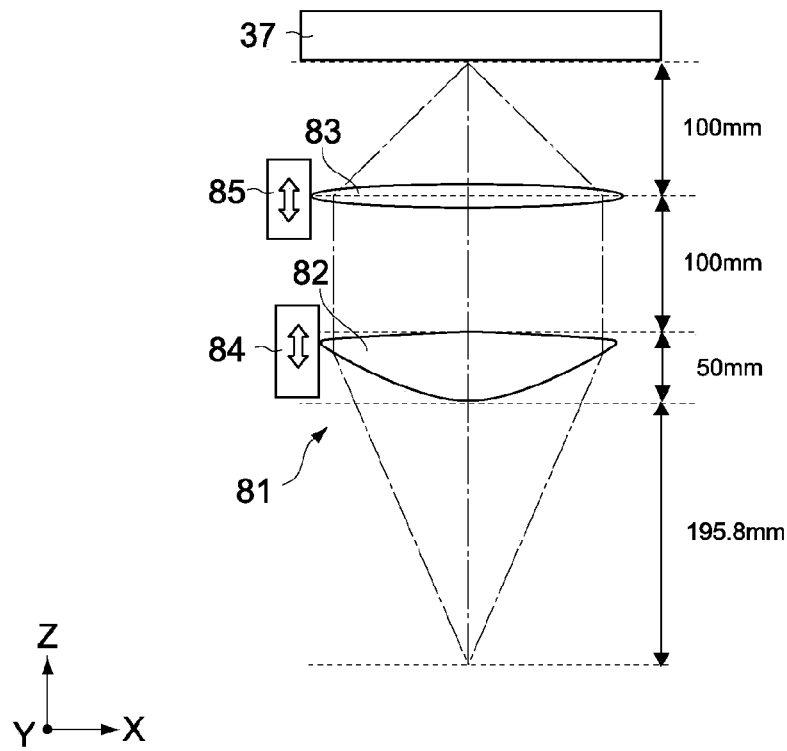
FIG. 7 is a diagram showing a high-magnification optical system included in a microscope system according to still another embodiment.

FIG. 7 is a diagram showing a high-magnification optical system included in a microscope system according to the third embodiment.

As shown in FIG. 7, a high-magnification optical system 81 includes an objective lens 82 and an image-forming lens 83.

The objective lens 82 and the image-forming lens 83 are held by lens movement mechanisms 84 and 85, respectively, so as to be movable along an optical axis. The objective lens 82 and the image-forming lens 83 can correct spherical aberration by the lens movement mechanisms 84 and 85 displacing a relative distance.

In other words, the objective lens 82 and the image-forming lens 83 in the third embodiment also serve as spherical aberration correction lenses.

The objective lens 82 has aspheric surfaces on both sides, and the spherical aberration of the objective lens 82 is corrected. A focal length of the objective lens 82 is set to, for example, 200 mm, and a distance from a leading end portion of the objective lens 82 on a front surface side to a focus position is set to, for example, 195.8 mm. A radius of curvature of the objective lens 82 on a rear surface side is set to, for example, 813.645 mm, and a conic constant on the rear surface side is set to, for example, −51.05. Further, a radius of curvature of the objective lens 82 on the front surface side is set to, for example, −116.359 mm, and a conic constant on the front surface side is set to, for example, −2.5907.

An NA (numerical aperture) of the objective lens 82 on the object side is 0.707, for example, and a thickness of the objective lens 82 is 50 mm, for example.

It should be noted that values of the focal length, radius of curvature, conic constant, NA, thickness, and the like of the objective lens 82 are not limited to the values described above, and other values may of course be possible.

As the image-forming lens 83, an ideal thin lens is assumed. A focal length of the image-forming lens 83 is set to 100 mm, for example, but the focal length is not limited thereto.

As described above, though the objective lens 82 and the image-forming lens 83 are movable, a distance between an image-forming surface of the first image pickup unit 37 and the image-forming lens 83 in a reference state is set to 100 mm, for example. Further, in the reference state, a distance between the image-forming lens 83 and a tail end portion of the objective lens 82 on the rear surface side is set to 100 mm, for example.

Figure 8:
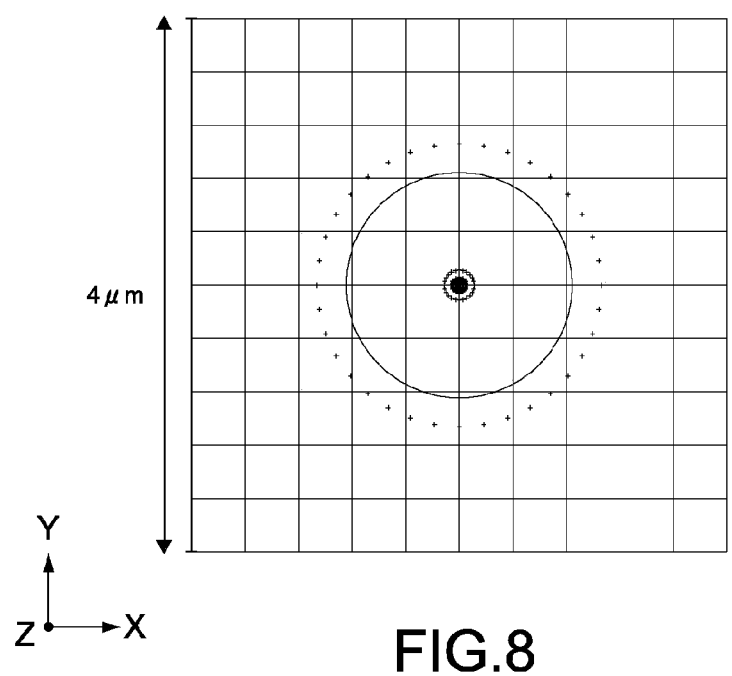
FIG. 8 is a spot diagram of the high-magnification optical system shown in FIG. 7.

FIG. 8 is a spot diagram of the high-magnification optical system shown in FIG. 7.

As shown in FIG. 8, an RMS (root mean square) radius of the spot diagram is 0.568 μm, which is substantially equal to a diffraction limit.

Next, there will be described a basic idea for preventing an object-to-image distance of the high-magnification optical system 81 from being changed when the lenses 82 and 83 included in the high-magnification optical system 81 are moved and spherical aberration is corrected.

Figure 9:
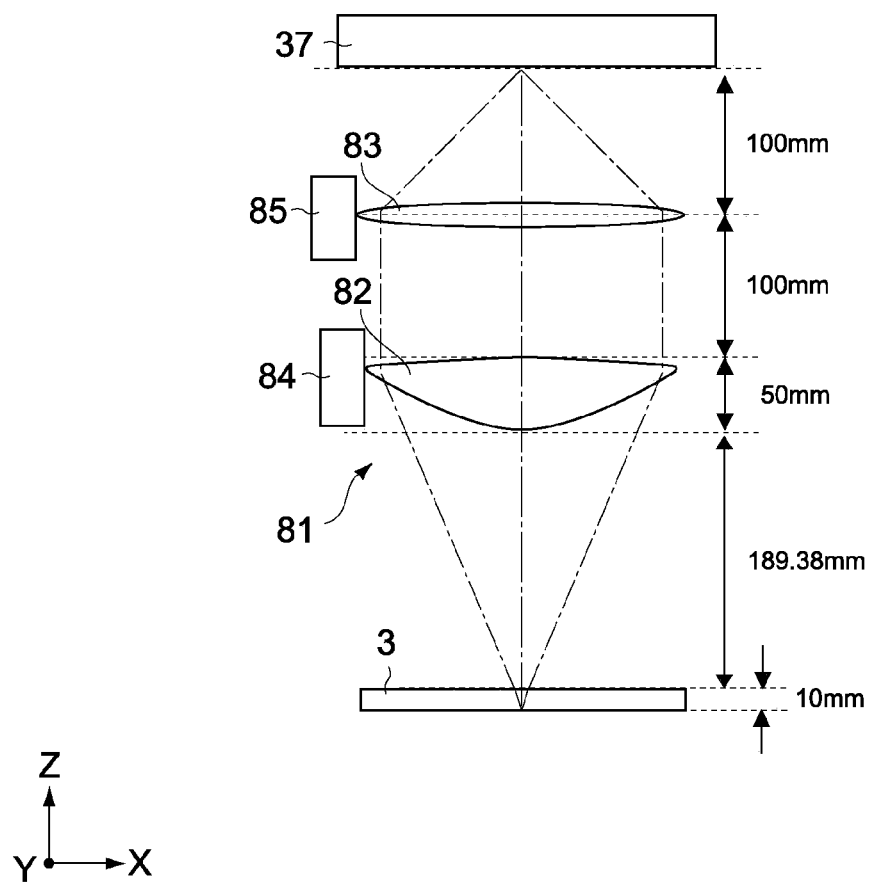
FIG. 9 is a diagram for explaining a basic idea for preventing an object-to-image distance of the high-magnification optical system from being changed when spherical aberration is corrected.

FIGS. 9, 10, and 11 are diagrams for explaining the basic idea.

As shown in FIG. 9, the cover slip 3 having a thickness of 10 mm is inserted into the high-magnification optical system 81, and a focus is adjusted to the bottom surface of the cover slip 3.

A distance between a focus position and an image-forming position (object-to-image distance) in this case is 449.38 mm (=100 mm+100 mm+50 mm+189.38 mm+10 mm).

On the other hand, an object-to-image distance of the case shown in FIG. 7, that is, the case where a cover slip is not inserted is 445.8 mm (=100 mm+100 mm+50 mm+195.8 mm).

Therefore, in a case where the cover slip 3 having a thickness of 10 mm is inserted into the high-magnification optical system 81, the object-to-image distance is increased by 3.58 mm as compared to the case where the cover slip 3 is not inserted. This is because a refractive index of the cover slip 3 (for example, refractive index of 1.5) causes a displacement of the focus position.

Figure 10A:
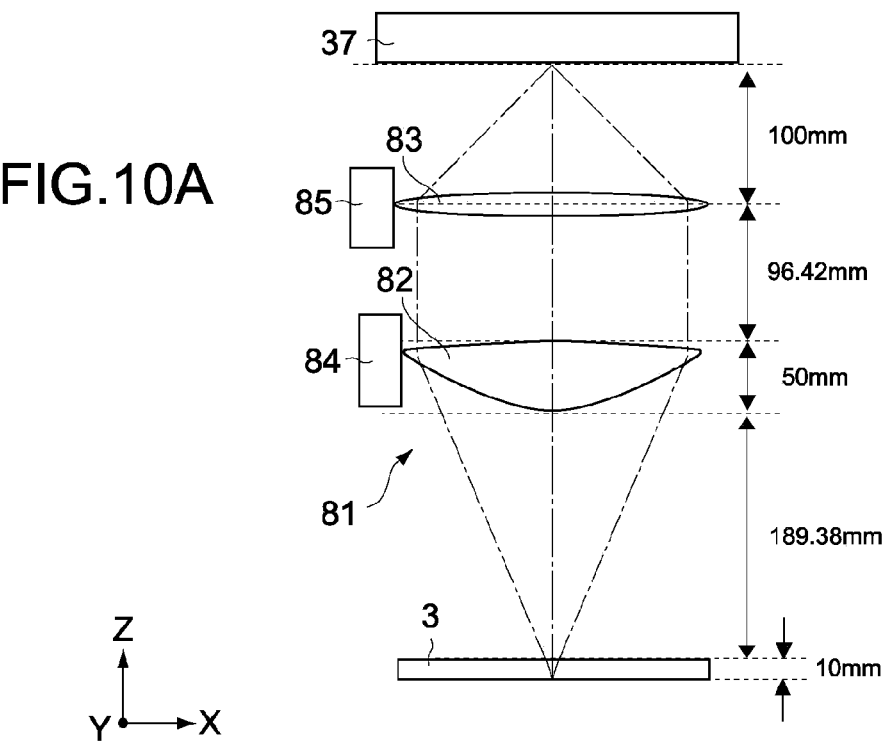
FIGS. 10 are diagrams for explaining the basic idea for preventing an object-to-image distance of the high-magnification optical system from being changed when spherical aberration is corrected.

The object-to-image distance is left changed in this state. So, in order to match the object-to-image distance to that of the case where the cover slip 3 is not inserted, it is assumed that the distance between the objective lens 82 and the image-forming lens 83 is adjusted as shown in FIG. 10A. Specifically, the objective lens 82 is moved upwardly by 3.58 mm, and the cover slip 3 is moved upwardly by 3.58 mm.

In this case, the object-to-image distance becomes 445.8 mm (=100 mm+96.42 mm+50 mm+189.38 mm+10 mm, which is matched to the object-to-image distance of the case where the cover slip 3 is not inserted.

Figure 10B:
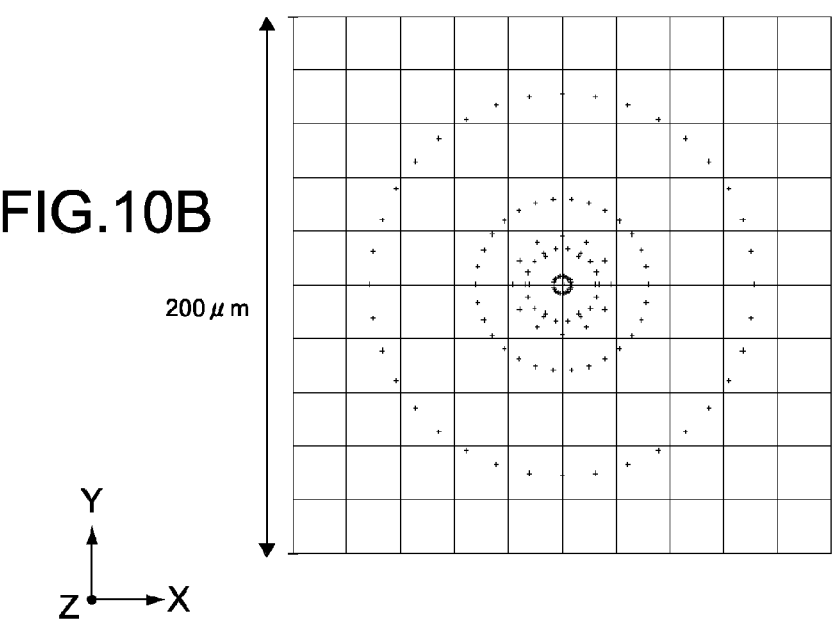

FIG. 10B is a spot diagram of the case shown in FIG. 10A.

As shown in FIG. 10B, the RMS radius of the spot diagram is significantly deteriorated due to the influence of the spherical aberration and is 41 μm. In other words, the RMS radius is significantly deteriorated due to the influence of the spherical aberration even when the object-to-image distances are matched.

This spherical aberration can be corrected by changing a distance between the cover slip 3 (object) and the image-forming lens 83.

Figure 11A:
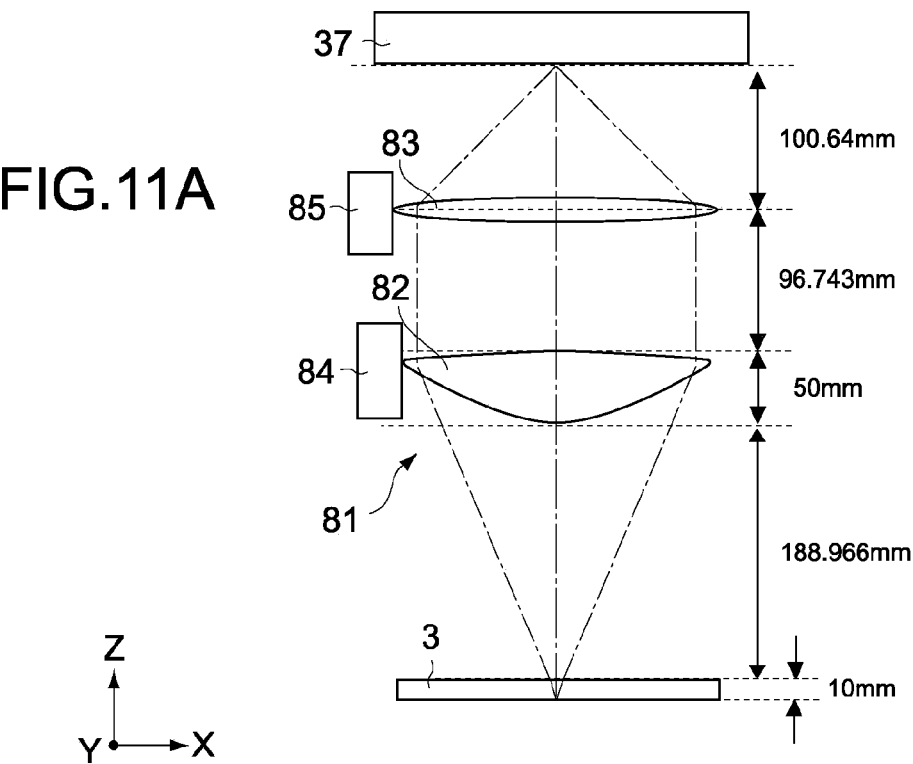
FIGS. 11 are diagrams for explaining the basic idea for preventing an object-to-image distance of the high-magnification optical system from being changed when spherical aberration is corrected.

FIG. 11A shows a positional relationship among the respective members in a case where the object-to-image distance is matched to that of the case where the cover slip 3 is not inserted and the RMS becomes minimum.

As shown in FIG. 11A, in a case where the cover slip 3 having a thickness of 10 mm is inserted into the high-magnification optical system 81, a distance between the image-forming surface and the image-forming lens 83 is set to 100.064 mm (a distance between the upper surface of the cover slip 3 and the image-forming lens 83 is set to 345.709 mm). Further, a distance between the image-forming lens 83 and the rear surface of the objective lens 82 is set to 96.743 mm, and a distance between the front surface of the objective lens 82 and the upper surface of the cover slip 3 is set to 188.966 mm.

By setting the image-forming lens 83, the objective lens 82, and the like to have the positional relationship described above, the spherical aberration can be corrected appropriately with the object-to-image distance being kept constant.

Figure 11B:
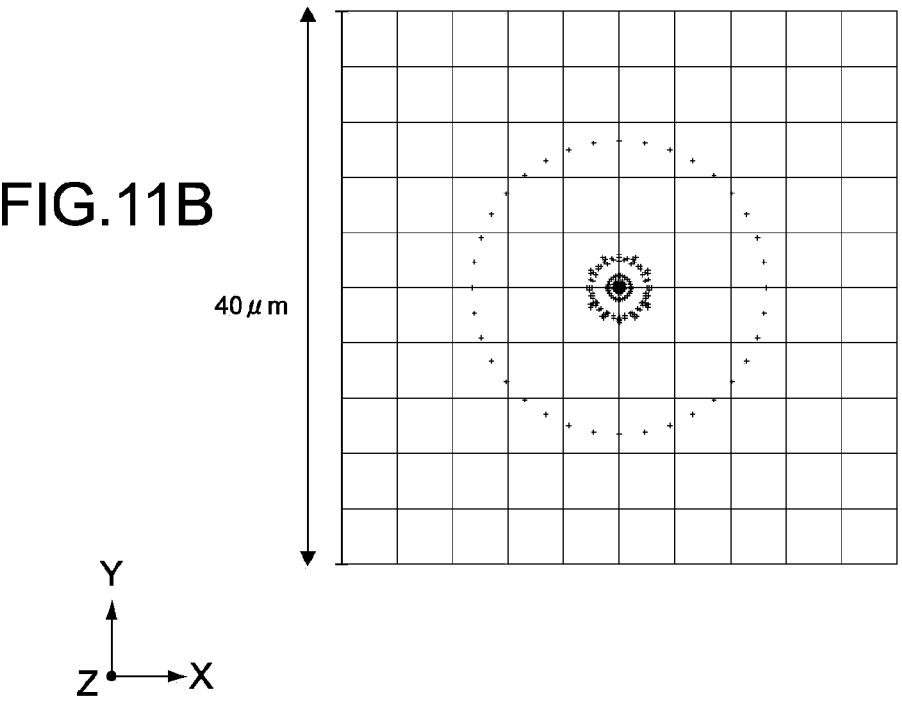

FIG. 11B is a spot diagram of the case shown in FIG. 11A.

As shown in FIG. 11B, the spherical aberration is appropriately corrected and an RMS radius in this case is 5.79 μm.

Figures 12, 13:
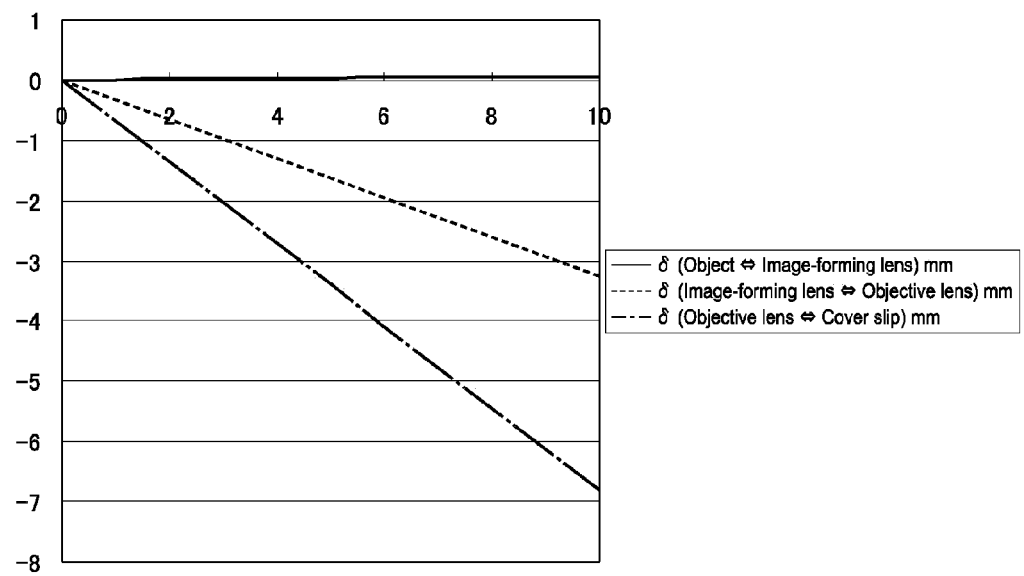
FIG. 12 is a table showing a relationship between a thickness of a cover slip and various parameters.
FIG. 13 is a graph showing cam curves obtained by graphing the table shown in FIG. 12.

FIG. 12 is a table showing a relationship between a thickness of the cover slip 3 and various parameters. In FIG. 12, a distance between the cover slip 3 (object) and the image-forming lens 83, a distance between the image-forming lens 83 and the rear surface of the objective lens 82, a distance between the front surface of the objective lens 82 and the upper surface of the cover slip 3, and an RMS radius are indicated as the various parameters.

FIG. 13 is a graph showing cam curves obtained by graphing the table shown in FIG. 12.

It should be noted that FIGS. 12 and 13 each show a change amount with the cover slip 3 having a thickness of zero being as a reference (see FIG. 7).

Though FIGS. 12 and 13 show a relationship between the thickness of the cover slip 3 and various parameters, the relationship shown in FIGS. 12 and 13 is also established for a relationship between the distance D4 extending from the upper surface of the cover slip 3 to the focus position (see FIG. 5) and the various parameters.

Typically, the main controller 51 may move the image-forming lens, the objective lens, and the stage based on the distance D4 calculated by Expression (1) or (2) described above so that the various parameters satisfy the relationship shown in FIGS. 12 and 13. As a result, the spherical aberration can be corrected appropriately with the object-to-image distance being kept constant.

As described above, since the spherical aberration can be corrected appropriately with the object-to-image distance being kept constant in the third embodiment, high-speed and simple focusing is realized.

Modified example of third embodiment

In the third embodiment, both the objective lens 82 and the image-forming lens 83 are moved by the lens movement mechanisms 84 and 85 along the optical axis. However, only one of the objective lens 82 and the image-forming lens 83 may be moved by the lens movement mechanisms. In addition, the case where the high-magnification optical system 81 is constituted of the two lenses 82 and 83 has been described in the third embodiment, but the number of lenses included in the high-magnification optical system 81 may be three or more. In this case, the number of lenses moved by the lens movement mechanisms along the optical axis (spherical aberration correction lenses) is not particularly limited.

(Various modified examples)

In the embodiments described above, the stage 41 side is moved in the vertical direction (z-axis direction) when a focusing is performed. However, the present application is not limited thereto, and the microscope tube 36 side may be moved in the vertical direction. Alternatively, both the stage 41 side and the microscope tube 36 side may be relatively movable in the vertical direction.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A microscope system, comprising:
   an accommodation unit capable of accommodating a plurality of specimens;
   a stage on which each of the specimens loaded from the accommodation unit is placed;
   an optical system including a lens for spherical aberration correction;
   an image pickup unit capable of capturing a partial image of each of the specimens placed on the stage, via the optical system;
   a movement mechanism to move the lens for spherical aberration correction along an optical axis;
   a control unit to control movement of the lens for spherical aberration correction by the movement mechanism and correct spherical aberration;
   an image processing unit to combine the partial images captured by the image pickup unit and generate a composite image;
   a display unit to display the generated composite image;
   a microscope tube including the optical system;
   a movement unit to move at least one of the microscope tube and the stage along the optical axis; and
   a distance measurement unit,
   wherein the control unit calculates a first distance between an upper surface of each of the specimens and a focus position of the optical system, and controls the movement mechanism to move the lens for spherical aberration correction in accordance with the first distance,
   wherein the distance measurement unit measures a second distance between a predetermined position on a microscope tube side and the upper surface of each of the specimens, and
   wherein the control unit executes focusing by controlling the movement unit and calculates the first distance based on information of the second distance obtained from the distance measurement unit at a time when focus is obtained.

2. The microscope system according to claim 1, wherein the control unit moves the lens for spherical aberration correction such that a distance between the focus position of the optical system and an image-forming position is kept constant.

3. The microscope system according to claim 1, further comprising
   a pre-scan unit to pre-scan each of the specimens before the image pickup unit captures the partial image of each of the specimens,
   wherein the control unit calculates the first distance based on information obtained by the pre-scan unit.

4. The microscope system according to claim 1, further comprising
   a thickness measurement unit to measure a thickness of each of the specimens,
   wherein the control unit calculates the first distance based on information of the thickness of each of the specimens.

5. The microscope system according to claim 1,
   wherein the control unit executes focusing of a through-the-lens system.

6. A method of controlling a microscope system, comprising:
   loading a specimen from an accommodation unit capable of accommodating a plurality of specimens and placing the specimen on a stage;
   correcting spherical aberration by control of a movement mechanism that moves a lens for spherical aberration correction along an optical axis of a microscope tube including an optical system including the lens for spherical aberration correction, the correction of spherical aberration including
      calculating a first distance between an upper surface of each of the specimens and a focus position of the optical system, and controlling the movement mechanism to move the lens for spherical aberration correction in accordance with the first distance,
      measuring a second distance between a predetermined position on a microscope tube side and the upper surface of each of the specimens, and
      executing focusing by controlling the movement unit and calculating the first distance based on information of the second distance obtained from the distance measurement unit at a time when focus is obtained;
   acquiring information of a partial image of the specimen placed on the stage from an image pickup unit that is capable of capturing the partial image via the optical system;
   generating a composite image based on the information of the partial image; and
   displaying the generated composite image on a display unit.

* * * * *